United States Patent
Nanri et al.

(10) Patent No.: US 10,293,536 B2
(45) Date of Patent: May 21, 2019

(54) CONTROLLER AND MANAGEMENT SYSTEM FOR INJECTION MOLDING MACHINE

(71) Applicant: FANUC CORPORATION, Yamanashi (JP)

(72) Inventors: Kodai Nanri, Yamanashi (JP); Junpei Maruyama, Yamanashi (JP); Kazuyoshi Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/822,635

(22) Filed: Nov. 27, 2017

(65) Prior Publication Data

US 2018/0147765 A1 May 31, 2018

(30) Foreign Application Priority Data

Nov. 29, 2016 (JP) .................. 2016-231596

(51) Int. Cl.
*B29C 45/76* (2006.01)
*B29C 45/66* (2006.01)
*B29C 45/17* (2006.01)

(52) U.S. Cl.
CPC .......... *B29C 45/7653* (2013.01); *B29C 45/66* (2013.01); *B29C 45/661* (2013.01);
(Continued)

(58) Field of Classification Search
CPC ... B29C 45/66; B29C 45/661; B29C 45/7653; B29C 2045/1792; B29C 2945/76013;
(Continued)

(56) References Cited

U.S. PATENT DOCUMENTS 5,753,153 A * 5/1998 Choi ................... B29C 45/12
264/328.1
6,906,631 B2 * 6/2005 Yamazaki .......... B29C 45/7653
264/40.1
(Continued)

FOREIGN PATENT DOCUMENTS

CN 1750920 A 3/2006
CN 103057064 A 4/2013
(Continued)

OTHER PUBLICATIONS

English Abstract for Japanese Publication No. 2007196391 A, published Aug. 9, 2007, 1 pg.
(Continued)

*Primary Examiner* — James P Mackey
(74) *Attorney, Agent, or Firm* — Fredrikson & Byron, P.A.

(57) ABSTRACT

A controller of an injection molding machine controls mold clamping of a fixed mold and a movable mold. The controller includes a servomotor drive control unit for limiting increase in driving current during driving of a mold clamping servomotor, and a moving state acquisition unit that acquires a detection signal of an encoder. The controller further includes an abnormality determination processing unit for determining that a clamping force sensor is abnormal when recognizing stoppage of movement of the movable mold during mold clamping, based on the acquired detection signal of the encoder.

7 Claims, 9 Drawing Sheets

(52) U.S. Cl.
CPC ............... *B29C 2045/1792* (2013.01); *B29C 2045/1794* (2013.01); *B29C 2945/76013* (2013.01); *B29C 2945/76033* (2013.01); *B29C 2945/76083* (2013.01); *B29C 2945/76093* (2013.01); *B29C 2945/76163* (2013.01); *B29C 2945/76234* (2013.01); *B29C 2945/76391* (2013.01); *B29C 2945/76505* (2013.01); *B29C 2945/76712* (2013.01)

(58) Field of Classification Search
CPC ........... B29C 2945/76033; B29C 2945/76083; B29C 2945/76093; B29C 2945/76163; B29C 2945/7623; B29C 2945/76391; B29C 2945/76234
See application file for complete search history.

(56) References Cited

U.S. PATENT DOCUMENTS

| | | | |
|---|---|---|---|
| 2013/0095200 A1* | 4/2013 | Maruyama | ............ B29C 45/768 425/171 |
| 2013/0156875 A1* | 6/2013 | Maruyama | .............. B29C 45/84 425/150 |

FOREIGN PATENT DOCUMENTS

| | | | |
|---|---|---|---|
| DE | 10 2009 037 697 | * | 3/2010 |
| JP | 486209 A | | 3/1992 |
| JP | 752219 A | | 2/1995 |
| JP | 776033 A | | 3/1995 |
| JP | 886706 A | | 4/1996 |
| JP | 2007196391 A | | 8/2007 |
| JP | 2010137542 A | | 6/2010 |

OTHER PUBLICATIONS

English Abstract for Japanese Publication No. 07-076033 A, published Mar. 20, 1995, 1 pg.

Untranslated Decision to Grant a Patent mailed by Japan Patent Office (JPO) for Application No. JP 2016-231596 dated May 8, 2018, 3 pages.

English machine translation of Decision to Grant a Patent mailed by Japan Patent Office (JPO) for Application No. JP 2016-231596 dated May 8, 2018, 3 pages.

Untranslated Notification of Reasons for Refusal mailed by Japan Patent Office (JPO) for Application No. JP 2016-231596, dated Feb. 20, 2018, 3 pages.

Translated Notification of Reasons for Refusal mailed by Japan Patent Office (JPO) for Application No. JP 2016-231596, dated Feb. 20, 2018, 3 pages.

English Abstract and Machine Translation for Japanese Publication No. 2010-137542 A, published Jun. 24, 2010, 17 pgs.

English Abstract and Machine Translation for Japanese Publication No. 08-086706 A, published Apr. 2, 1996, 7 pgs.

English Abstract and Machine Translation for Japanese Publication No. 04-086209 A, published Mar. 18, 1992, 6 pgs.

English Abstract and Machine Translation for Chinese Publication No. 1750920 A, published Mar. 22, 2006, 20 pgs.

English Abstract and Machine Translation for Chinese Publication No. 103057064 A, published Apr. 24, 2013, 10 pgs.

English Abstract and Machine Translation for Japanese Publication No. 07-052219 A, published Feb. 28, 1995, 10 pgs.

* cited by examiner

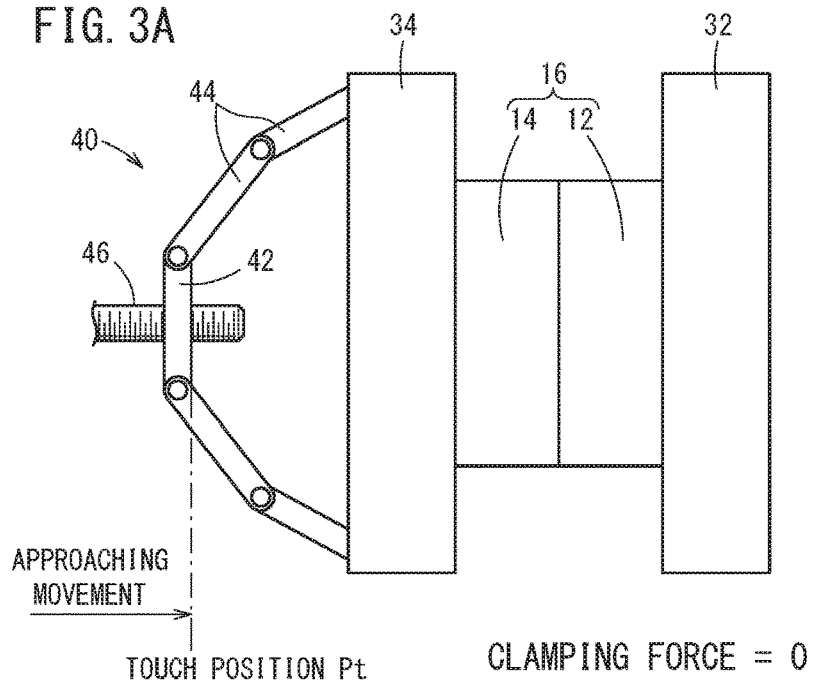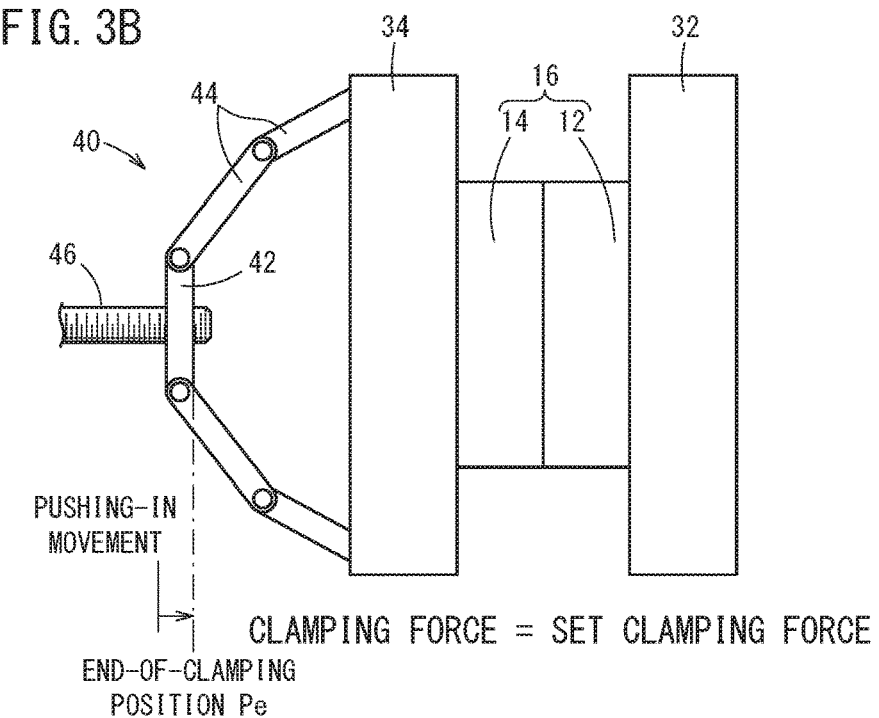

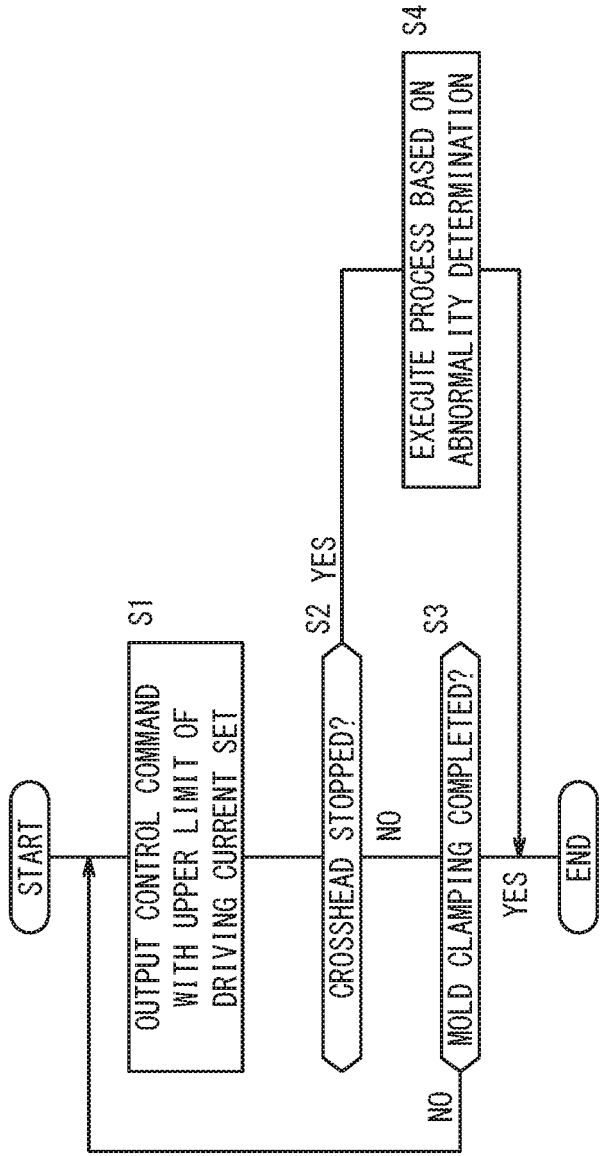
F I G. 6

CONTROLLER AND MANAGEMENT SYSTEM FOR INJECTION MOLDING MACHINE

CROSS-REFERENCE TO RELATED APPLICATION

This application is based upon and claims the benefit of priority from Japanese Patent Application No. 2016-231596 filed on Nov. 29, 2016, the contents of which are incorporated herein by reference.

BACKGROUND OF THE INVENTION

Field of the Invention

The present invention relates to a controller and a management system for an injection molding machine for clamping a mold.

Description of the Related Art

The injection molding machine has an injection mold (made up of a fixed mold and a movable mold) into which a molding material is injected, and performs injection molding by moving the movable mold relative to the fixed mold to thereby bring the molds into contact with each other, and then clamping the molds with a predetermined clamping force. If the clamping force is weaker than the predetermined level, there is a risk of the molding material leaking from the injection mold, burrs occurring in the molded product, etc. Conversely, if the clamping force is greater than the predetermined level, there is a risk of a failure occurring in a machine (for example, in the driving mechanism of the movable mold).

Therefore, in the injection molding machine, it is important to control the injection mold so as to have a predetermined clamping force. For example, Japanese Laid-Open Patent Publication No. 04-086209 discloses an injection molding machine in which, based on the position of the movable mold (the crosshead of the toggle mechanism) and the clamping force, the position to which the crosshead can be moved forward is calculated so as to properly control the clamping force applied to the injection mold.

SUMMARY OF THE INVENTION

Meanwhile, in the injection molding machine as described above, in order to obtain a predetermined clamping force with high accuracy upon injection molding, an adjustment operation is performed before machining. In the adjustment operation, for example, the clamping force applied to the injection mold is detected by a clamping force sensor so as to adjust the end-of-clamping position of the movable mold (i.e., the clamping force of the injection mold). However, when an abnormality occurs in the clamping force sensor, the adjustment of the clamping force itself results in failure. If such adjustment failure occurs, there is a risk that, for example, the injection molding machine generates an excessive clamping force between the fixed and movable molds in mold-clamping, thereby causing machine failure or some other problems.

The present invention has been devised in view of the above circumstances, it is therefore an object of the present invention to provide a controller and a management system for an injection molding machine, which can avoid application of excessive clamping force by a simple structure and accurately determine abnormality of a clamping force sensor.

According to a first aspect of the present invention, there is provided a controller for an injection molding machine for controlling mold clamping of a fixed mold and a movable mold, including: a motor drive control unit configured to control driving current of a motor and set an upper limit of driving current to limit increase in the driving current during driving of the motor, the motor being configured to move the movable mold and generate a clamping force; a moving state acquisition unit configured to acquire information on movement of the movable mold; a clamping force acquisition unit configured to acquire information on the clamping force from a clamping force detector configured to detect information on the clamping force with which the fixed mold and the movable mold are clamped; a mold clamping adjusting unit configured to adjust an end-of-clamping position of the movable mold by operating a mold clamping adjustment mechanism based on the information on the clamping force; and an abnormality determination processing unit configured to determine that the clamping force detector is abnormal when recognizing stoppage of movement of the movable mold during mold clamping, based on the information from the moving state acquisition unit.

According to a second aspect of the present invention, there is provided a management system that includes a controller for an injection molding machine configured to control mold clamping of a fixed mold and a movable mold, and a central management device connected to the controller so as to be able to perform information communication, the management system managing states of multiple injection molding machines by the central management device, wherein the controller for each of the multiple injection molding machines includes: a motor drive control unit configured to control driving current of a motor and set an upper limit of the driving current to limit increase in the driving current during the driving of the motor, the motor being configured to move the movable mold and generate a clamping force; a moving state acquisition unit configured to acquire information on movement of the movable mold; a clamping force acquisition unit configured to acquire information on the clamping force from a clamping force detector configured to detect information on the clamping force with which the fixed mold and the movable mold are clamped; and a mold clamping adjusting unit configured to adjust an end-of-clamping position of the movable mold by operating a mold clamping adjustment mechanism based on the information on the clamping force, and the controller or the central management device is configured to determine that the clamping force detector is abnormal when recognizing stoppage of movement of the movable mold during mold clamping, based on the information from the moving state acquisition unit, and give a notice based on determination of abnormality.

According to the present invention, the controller and management system of the injection molding machine sets an upper limit of driving current during clamping to limit the rise of the driving current by the motor drive control unit, whereby it is possible to prevent the clamping force from being applied excessively to the movable and fixed molds. That is, breakage of the machine and other failures due to excessive clamping force can be suppressed with a simple structure. Further, it is determined that a large clamping force is applied to the movable and fixed molds if the driving current is limited. In addition, the controller or the central management device detects stoppage of movement of the movable mold during mold clamping, so that it is possible to accurately determine occurrence of an abnormality of the clamping force detector. Thus, it is possible to detect an abnormality of the clamping force detector at an early stage and suppress manufacturing defects of molded products, damage to the machine, and other faults.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3A is a schematic side view illustrating a state where a crosshead is located at a touch position;

FIG. 3B is a schematic side view illustrating a state where the crosshead is located at an end-of-clamping position;

FIG. 6 is a flowchart showing a processing flow of determining whether a clamping force sensor is abnormal or not, according to the first embodiment;

DESCRIPTION OF THE PREFERRED EMBODIMENTS

Preferred embodiments of the controller and management system of an injection molding machine according to the present invention will be described hereinbelow in detail with reference to the accompanying drawings.

First Embodiment

Figure 1:
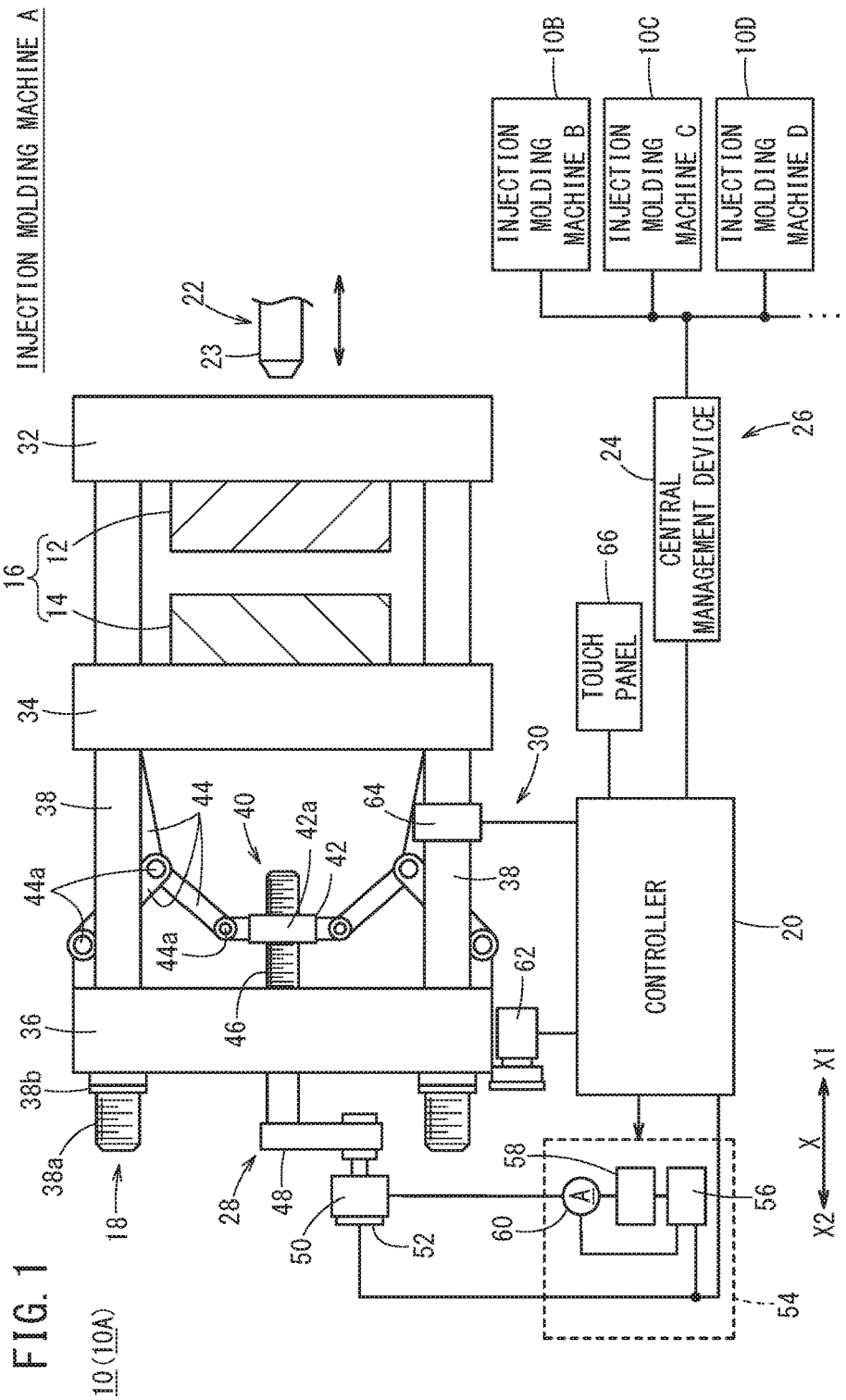
FIG. 1 is an illustrative view schematically showing the overall configuration of an injection molding machine, a controller and a management system according to a first embodiment of the present invention.

As shown in FIG. 1, an injection molding machine 10 according to the first embodiment of the present invention forms a molded product (not shown) by clamping an injection mold 16 (die) made up of a fixed mold 12 and a movable mold 14 and injecting a molding material into a cavity formed in the injection mold 16. The injection molding machine 10 includes a mold clamping device 18 for clamping the mold 16, a mold clamping controller 20 for controlling the mold clamping device 18, an injection device 22 for injecting a resin material into the clamped injection mold 16, and an injection controller (not shown) for controlling the injection device 22. It is noted that the mold clamping controller 20 may be configured to control the injection device 22 together with the mold clamping device (that is, control the entire operation of the injection molding machine 10). Hereinafter, the mold clamping controller 20 will be simply referred to as the controller 20.

Further, in factories for manufacturing molded products, multiple injection molding machines 10 (see injection molding machines A to D in FIG. 1) are usually installed. In the factory, the controller 20 of the multiple injection molding machines 10A to 10D are connected to a central management device 24 in a data communicable manner, thereby forming a management system 26. The central management device 24 constantly manages the state of each injection molding machine 10. For example, when recognizing occurrence of an abnormality in one of the multiple injection molding machines 10, the central management device 24 notifies the manager and operator of the factory (the injection molding machines 10) of the error.

The controller 20 and the management system 26 of the injection molding machine 10 according to the present embodiment are configured to suppress damage to the machine by producing appropriate clamping force and to determine an abnormality of a clamping force sensor (clamping force detector) 64 for detecting a clamping force, to thereby take measures against the trouble at an early stage. As a result, during machining, mold clamping of the injection molding machine 10 can be performed highly accurately, so that occurrence of defective molded products can be reduced. Hereinbelow, the controller 20 and the management system 26 of the injection molding machine 10 will be more specifically described.

The mold clamping device 18 includes a mold clamping mechanism 28 for performing operation of the injection mold 16, a mold clamping adjustment mechanism 30 for adjusting the clamping force (mold height) of the injection mold 16 for injection-molding, and an ejector mechanism (not shown) for ejecting the molded product from the injection mold 16. On the other hand, the injection device 22 includes a cylinder 23 having a tip that comes into contact with a gate communicating with the cavity of the injection mold 16 to inject a molding material. Though not illustrated, the injection device 22 includes a screw accommodated inside the cylinder 23 and which rotates to thereby flow the molding material, a heater arranged around the cylinder 23 for heating, a hopper for supplying the resin material to the cylinder 23, etc.

The mold clamping mechanism 28 of the mold clamping device 18 moves, opens and closes the injection mold 16. More specifically, before formation of a molded product, the mold clamping mechanism 28 moves the movable mold 14 toward the fixed mold 12 so as to bring the movable mold 14 in contact with the fixed mold 12, and performs mold-clamping operation for pressing the movable mold 14 against the fixed mold 12. Upon the mold-clamping operation, the mold clamping mechanism 28 closes (clamps) the injection mold 16 with a strong clamping force such that the mold 16 will not open due to the pressure of the molding material being injected. Then, after forming the molded product, the mold clamping mechanism 28 performs mold-opening operation for retracting the movable mold 14 away from the fixed mold 12.

In order to perform the above operations, the mold clamping mechanism 28 includes a stationary platen 32, a moving platen 34, a rear platen 36, multiple (four in the present embodiment) tie bars 38, and a toggle mechanism 40.

The stationary platen 32 is a platen that supports the fixed mold 12 so as to face the movable mold 14 and receives the clamping force applied to the fixed mold 12 in the mold-clamping operation. The stationary platen 32 is formed in a rectangular frame shape with its four corners joined and fixed to the four tie bars 38 on one end side (first end portions) (the X1 side in FIG. 1).

Similarly to the stationary platen 32, the moving platen 34 is a platen that receives the clamping force applied to the movable mold 14. The moving platen 34 is formed in a rectangular frame shape and disposed between the stationary platen 32 and the rear platen 36. When a moving force is applied by the mold clamping adjustment mechanism 30 or the toggle mechanism 40, the moving platen 34 is moved relative to the stationary platen 32. The four tie bars 38 are inserted and penetrate through the four corners of the moving platen 34 so that the moving platen 34 is guided along the tie bars 38 in the advancing direction and the separating direction relative to the fixed mold 12.

Like the stationary platen 32 and the moving platen 34, the rear platen 36 is formed in a rectangular frame shape with its four corners joined and fixed to the four tie bars 38 on the other end side (second end portions) (X2 side in FIG. 1). The proximal end side of the toggle mechanism 40 is coupled to and supported by the rear platen 36. The rear platen 36 constitutes part of the mold clamping adjustment mechanism 30, and the fixed position of the rear platen 36 on the tie bars 38 can be changed integrally with the moving platen 34 and the toggle mechanism 40, along the tie bars 38.

Each of the four tie bars 38 extends in the horizontal direction (the direction of the arrow X in FIG. 1) and supports the three platens 32, 34 and 36. Further, the second end portion of each tie bar 38 constitutes part of the mold clamping adjustment mechanism 30. The second end portion of each tie bar is provided with a male thread portion 38a for shifting the position of the rear platen 36, on which a tie bar nut 38b is attached. The mold clamping adjustment mechanism 30 will be described later.

The toggle mechanism 40 is a mechanical structure for moving the movable mold 14 and the moving platen 34 relative to the fixed mold 12 and the stationary platen 32. The toggle mechanism 40 includes a crosshead 42, multiple link members 44, a screw member 46, a transmission mechanism 48 and a mold clamping servomotor (motor) 50.

The crosshead 42 is supported by the multiple link members 44 and disposed at the center of the rear platen 36 in a front view as seen from the injection mold 16 side. The center portion of the crosshead 42 is provided with a nut 42a that is movably fitted on the screw member 46. The nut 42a is moved along the axial direction of the screw member 46 as the screw member 46 rotates.

The multiple link members 44 connect the moving platen 34, the rear platen 36 and the crosshead 42 via hinges 44a located on both sides of the link members 44. The link members 44, each pivoting on the associated hinges 44a, expand and contract as a whole in the direction of the arrow X. More specifically, as the crosshead 42 moves toward the stationary platen 32 in accordance with rotation of the screw member 46, the multiple link members 44 move along with the movement of the crosshead 42, and expand toward the stationary platen 32. On the other hand, when the crosshead 42 moves toward the rear platen 36 in accordance with rotation of the screw member 46, the multiple link members 44 move along with the movement of the crosshead 42, and contract toward the rear platen 36.

The screw member 46 extends from the crosshead 42, passing through the rear platen 36, to the proximal end side (the X2 side) beyond the rear platen 36, and supported by an unillustrated bearing so as to be rotatable around the axis. Unillustrated driven members (pulleys and gears) that receive driving force from the transmission mechanism 48 are coupled and fixed on the proximal end portion of the screw member 46. As the transmission mechanism 48, a belt, multiple gears and/or the like can be employed.

The mold clamping servomotor 50 rotates by supplying electric power, and transmits rotational driving force to the transmission mechanism 48. As a result, the screw member 46 of the toggle mechanism 40 is rotated to thereby shift the crosshead 42 on the screw member 46. Further, the moving platen 34 and the movable mold 14 are moved by way of the link members 44 which move along with the movement of the crosshead 42.

The mold clamping servomotor 50 is provided with an encoder 52 (rotary detection unit) such as a pulse coder for detecting the rotational position and rotational speed of the mold clamping servomotor 50. Since the mold clamping servomotor 50 moves the crosshead 42 as described above, the output signals from the encoder 52 include information on the position and moving speed of the crosshead 42 (the movable mold 14 and the moving platen 34). Here, the relationship between the position of the crosshead 42 of the toggle mechanism 40 and the position of the moving platen 34 can be obtained by a mathematical formula based on the dimensions of the link members 44, etc.

The mold clamping servomotor 50 is connected to a power supply unit 54 that receives control commands (information on position and speed) from the controller 20 and supplies electric power to the mold clamping servomotor 50. The power supply unit 54 includes an axis control circuit 56 connected to the controller 20 and which sets an output current value, a servo amplifier 58 for supplying driving current to the mold clamping servomotor 50 based on the output current value of the axis control circuit 56, and an ammeter 60 (current detector) for detecting the driving current of the servo amplifier 58. The power supply unit 54 may be provided inside the controller 20.

The axis control circuit 56 includes a processor, a memory, an input/output interface and the like, and calculates an output current value in response to a control command involving information on the position and speed of the crosshead 42. The encoder 52 and the ammeter 60 are connected to the axis control circuit 56, which performs feedback control on the position and speed of the crosshead 42 and the driving current of the mold clamping servomotor 50. That is, the axis control circuit 56 compares the output signal from the encoder 52 with the position and speed of the control command to thereby calculate the output current value, and further compares the obtained driving current value with the output current value to thereby compensate the output current value as appropriate.

The servo amplifier 58 controls the driving current to be output to the mold clamping servomotor 50, based on the output current value of the axis control circuit 56 to thereby control the torque of the mold clamping servomotor 50. The ammeter 60 detects the driving current output from the servo amplifier 58 and transmits the detected signal as a driving current value to the axis control circuit 56.

On the other hand, as described above the mold clamping adjustment mechanism 30 of the mold clamping device 18 is provided to adjust the mold height of the injection mold 16 in the mold clamping operation, in other words, to adjust the end-of-clamping position of the crosshead 42 (the movable mold 14). The mold clamping adjustment mechanism 30 includes the rear platen 36, the second end portions of the tie bars 38 (male thread portions 38a and the tie bar nuts 38b) and the toggle mechanism 40. Further, the mold clamping adjustment mechanism 30 includes a transmission mechanism (not shown) for rotating the tie bar nuts 38b, a mold height adjustment motor 62 for applying driving force to the transmission mechanism, and the clamping force sensor 64 for detecting the clamping force of the injection mold 16.

The mold height adjustment motor 62 rotates the four tie bar nuts 38b at the same time by the transmission mechanism to thereby move the rear platen 36 forward and backward along the tie bars 38. Since, as described above, the movable mold 14 and the moving platen 34 are coupled to the rear platen 36 with the toggle mechanism 40 interposed therebetween, the relative position between the movable mold 14 and the fixed mold 12 is adjusted by rotational driving of the mold height adjustment motor 62. The mold height adjustment motor 62 is connected to the controller 20 via an unillustrated inverter, so that the amount of rotation of the motor 62 is controlled under control of the controller 20.

The clamping force sensor 64 is configured as a clamping force detector for detecting the mold clamping force applied to the injection mold 16 during the clamping of the fixed mold 12 and the movable mold 14. The clamping force sensor 64 is provided on at least one of the four tie bars 38 and transmits a detection signal of clamping force to the controller 20 via an unillustrated A/D converter. As this type of clamping force sensor 64, a strain sensor (strain gauge) for measuring the elongation of the tie bar 38 in the clamped state can be employed.

More specifically, the tie bar 38 slightly elongates due to application of a tensile force depending on a clamping force applied to the injection mold 16 in the mold clamping operation. Therefore, by the clamping force sensor 64 acquiring the detection signal of the elongation of the tie bar 38 (information on the clamping force), the controller 20 can calculate the actual clamping force applied to the injection mold 16, using a predetermined formula and the elastic constant of the mechanism. It should be noted that the clamping force sensor 64 is not limited to the configuration that detects the elongation as the information on the clamping force. For example, a pressure sensor may be employed as the clamping force sensor 64, or a strain sensor which directly detects strain of the injection mold 16 may be employed.

On the other hand, the controller 20 is given as a computer including a processor, a memory, and an input/output interface (not illustrated). The processor executes an unillustrated control program stored in the memory to thereby control the operation of the mold clamping device 18. Further, the input/output interface of the controller 20 is connected to a touch panel 66 (notifying unit), which is a display/input device that allows the operator of the injection molding machine 10 to set various parameters and also displays information required for control.

Figure 2:
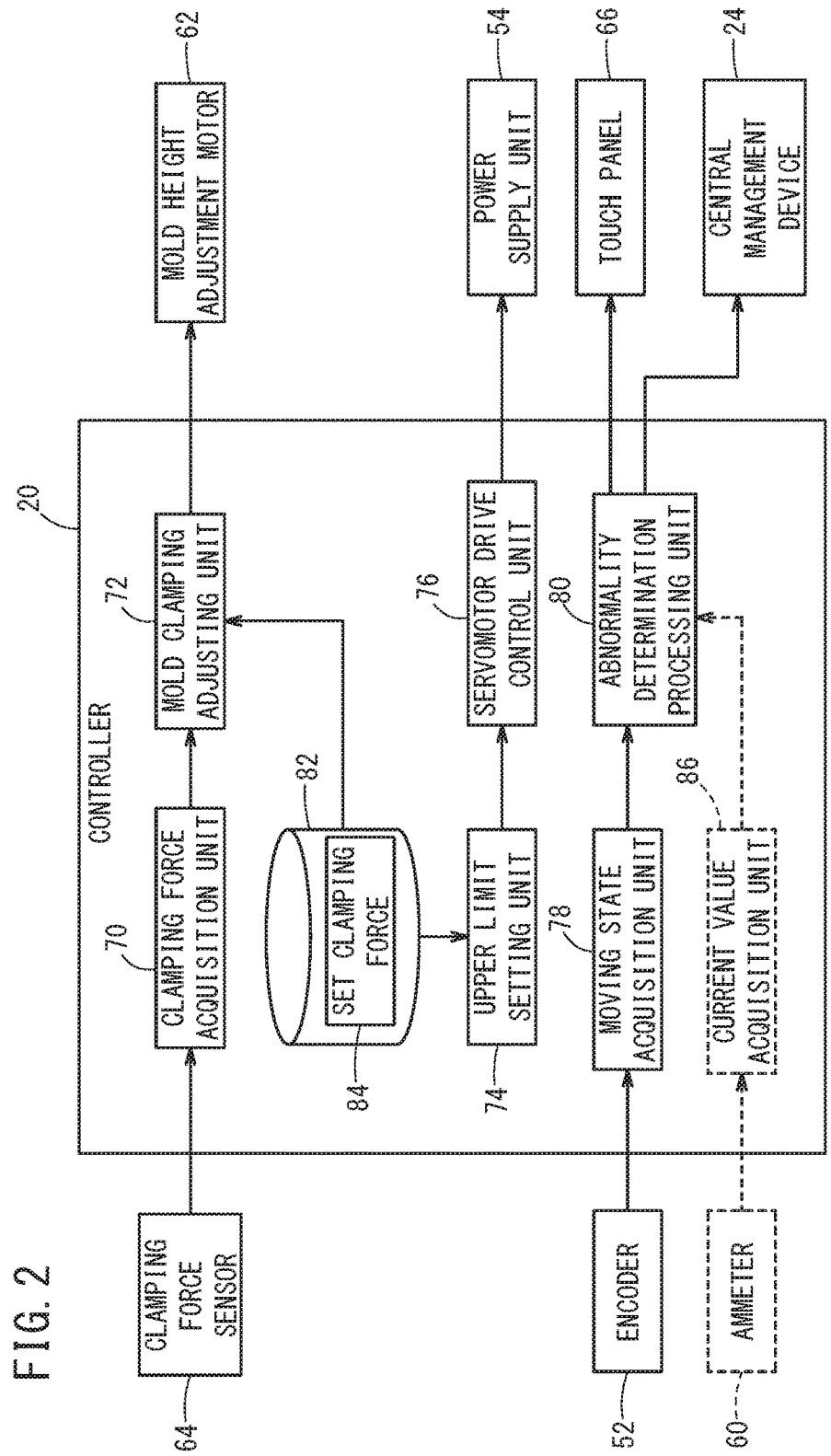
FIG. 2 is a functional block diagram of the controller in FIG. 1.

The controller 20, as shown in FIG. 2, contains therein functional units such as a clamping force acquisition unit 70, a mold clamping adjusting unit 72, an upper limit setting unit 74, a servomotor drive control unit (motor drive control unit) 76, a moving state acquisition unit 78, and an abnormality determination processing unit 80. The controller 20 further contains therein a parameter storage unit 82 in which various parameters input through the touch panel 66 by the operator are stored.

The clamping force acquisition unit 70 receives the detection signal transmitted from the clamping force sensor 64. The clamping force acquisition unit 70 calculates clamping force in response to the reception of the detection signal to recognize the clamping force actually applied to the injection mold 16 (hereinafter also referred to as the acquired clamping force). The acquired clamping force is temporarily stored in a storage unit (memory storage area: not shown) in the clamping force acquisition unit 70 and is also provided to the mold clamping adjusting unit 72.

The mold clamping adjusting unit 72 controls the driving of the mold height adjustment motor 62 in accordance with the acquired clamping force obtained by the clamping force acquisition unit 70. In this process, the mold clamping adjusting unit 72 reads the information on the clamping force (hereinafter referred to as a set clamping force 84) set in advance by the operator or the like and stored in the parameter storage unit 82, and drives the mold height adjustment motor 62 such that the acquired clamping force becomes equal to the set clamping force 84.

The upper limit setting unit 74 is a functional unit that sets the upper limit of the driving current when the mold clamping servomotor 50 is driven. In other words, the controller 20 according to the present embodiment is configured to set the upper limit of the driving current for the mold clamping servomotor 50 and drive the motor while limiting the torque at the time of clamping the injection mold 16.

Now, the significance of setting an upper limit for the driving current of the mold clamping servomotor 50 will be described in detail. As shown in FIG. 3A, the clamping force of the injection mold 16 remains zero until reaching a touch position Pt where the movable mold 14 touches the fixed mold 12. Then, as shown in FIG. 3B, as the movable mold 14 is pushed against the fixed mold 12 by the toggle mechanism 40, the clamping force increases from zero. Further, when movement of the crosshead 42 of the toggle mechanism 40 is completed and stopped at the predetermined end-of-clamping position Pe, the set clamping force 84 (see FIG. 2) set in advance by the operator is generated.

The set clamping force 84 is set by performing an adjustment operation before injection molding. This adjustment operation includes a mold clamping adjustment step and a trial step, which are sequentially performed. For example, in the mold clamping adjustment step, the mold clamping servomotor 50 is rotationally driven so as to position the crosshead 42 in advance at the end-of-clamping position Pe on the screw member 46, and then, in this state, operation by the mold clamping adjustment mechanism 30 (mold height adjustment motor 62) is performed. That is, the crosshead 42 is pushed and moved with the toggle mechanism 40 remaining extended while the elongation of the tie bar 38 is being monitored by the clamping force sensor 64. Then, the mold clamping adjusting unit 72 continues pushing (by rotating the mold height adjustment motor 62) the movable mold 14 until the acquired clamping force reaches the set clamping force 84, and then stops driving the mold height adjustment motor 62 when the set clamping force 84 is reached. Thus, the end-of-clamping position Pe of the crosshead 42 is set, and adjustment by the mold clamping adjustment mechanism 30 is temporarily ended.

Further, in the adjustment operation, with the mold clamping adjustment mechanism 30 in a stopped state, the mold clamping operation of the movable mold 14 by the toggle mechanism 40 is started as a trial step. Specifically, the controller 20 once retracts the movable mold 14 from the fixed mold 12 by use of the toggle mechanism 40, and then outputs a control command to the power supply unit 54. The power supply unit 54, based on the control command, controls the driving current for the mold clamping servomotor 50 to rotate the mold clamping servomotor 50. As a result, the crosshead 42 moves forward so that the movable mold 14 and the moving platen 34 move toward the fixed mold 12.

At the touch position Pt where the movable mold 14 comes in light contact with the fixed mold 12, the toggle mechanism 40 is not yet fully extended, so that the mold clamping servomotor 50 further rotates to move and push the movable mold 14 from the touch position Pt against the fixed mold 12. Then, as the crosshead 42 moves to the end-of-clamping position Pe as shown in FIG. 3B, the set clamping force 84 is achieved so that the mold clamping operation is completed. Thus, the adjustment operation is performed suitably, and the mold clamping operation of the injection mold 16 upon injection molding can be controlled with high precision.

In the above adjustment operation, it is important that the clamping force sensor 64 can indicate a correct value (i.e., no abnormality such as malfunction occurs). In the event that an abnormality occurs in the clamping force sensor 64, even if the position of the crosshead 42 is adjusted so as to produce the set clamping force 84 by driving the mold clamping adjustment mechanism 30, an incorrect clamping force is detected so that the end-of-clamping position Pe of the movable mold 14 deviates from the desired position. When the end-of-clamping position Pe deviates from the desired position like this, the toggle mechanism 40, for example, strongly pushes the movable mold 14 against the fixed mold 12 so as to generate an excessive force beyond the set clamping force 84. As a result, damage to the machine (for example, the toggle mechanism 40) or the like may occur.

To deal with this, in the controller 20 according to the present embodiment, the driving current is limited by the upper limit setting unit 74 so that the mold clamping servomotor 50 is driven with low torque.

Figure 4:
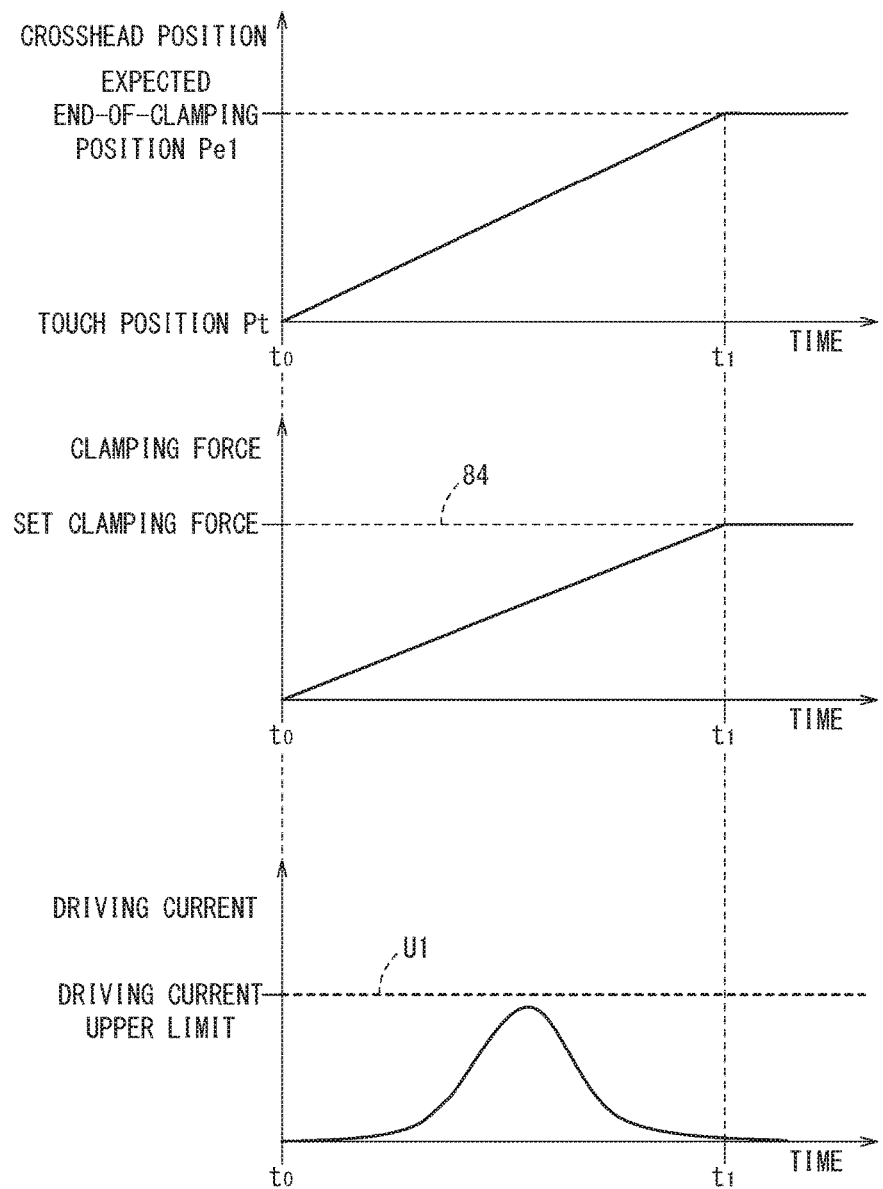
FIG. 4 is a graph showing an example of time variations of the crosshead position, clamping force and driving current when a clamping force sensor is normal.

Specifically, as shown in the top graph of FIG. 4, when the clamping force sensor 64 is normal, the crosshead 42 of the toggle mechanism 40 is positioned at the touch position Pt at time $t_0$, and then reaches an expected end-of-clamping position Pe1 at time $t_1$ after the elapse of a predetermined period of time from time $t_0$. In this case, as shown in the middle graph of FIG. 4, the clamping force increases as time proceeds from time $t_0$ to time $t_1$ and reaches the set clamping force 84 at time $t_1$ when the movement of the crosshead 42 is completed. From time $t_1$ on, the state of the set clamping force 84 is maintained.

As shown in the bottom graph in FIG. 4, during the period from time point $t_0$ to time $t_1$, the driving current supplied to the mold clamping servomotor 50 are low levels at around times $t_0$ and $t_1$ with a gentle peak in the middle part therebetween. This behavior is attributed to the mechanical properties of the toggle mechanism 40. More specifically, since the toggle mechanism 40 requires a certain level of torque for pushing and moving the crosshead 42 partway, the driving current is firstly raised. However, once the crosshead 42 passes through the intermediate point, the toggle mechanism 40 spontaneously extends without application of a strong torque, and accordingly the driving current is lowered.

The upper limit setting unit 74 shown in FIG. 2 sets an upper limit U1 (torque limit of the mold clamping servomotor 50) of the driving current at a current that produces a clamping force slightly greater than the set clamping force 84 generated in the mold clamping operation of the movable mold 14. The upper limit setting unit 74 may be configured to read the set clamping force 84 from the parameter storage unit 82 and automatically calculate the upper limit U1 using an appropriate formula. The upper limit U1 is set in such a manner that the driving current from time $t_0$ to time $t_1$ does not exceed the upper limit U1 as long as the end-of-clamping position Pe of the crosshead 42 is normal (that is, the clamping force sensor 64 is normal). The case where the driving current exceeds the upper limit U1 means that an extra torque (driving current) is needed to extend the toggle mechanism 40.

Figure 5:
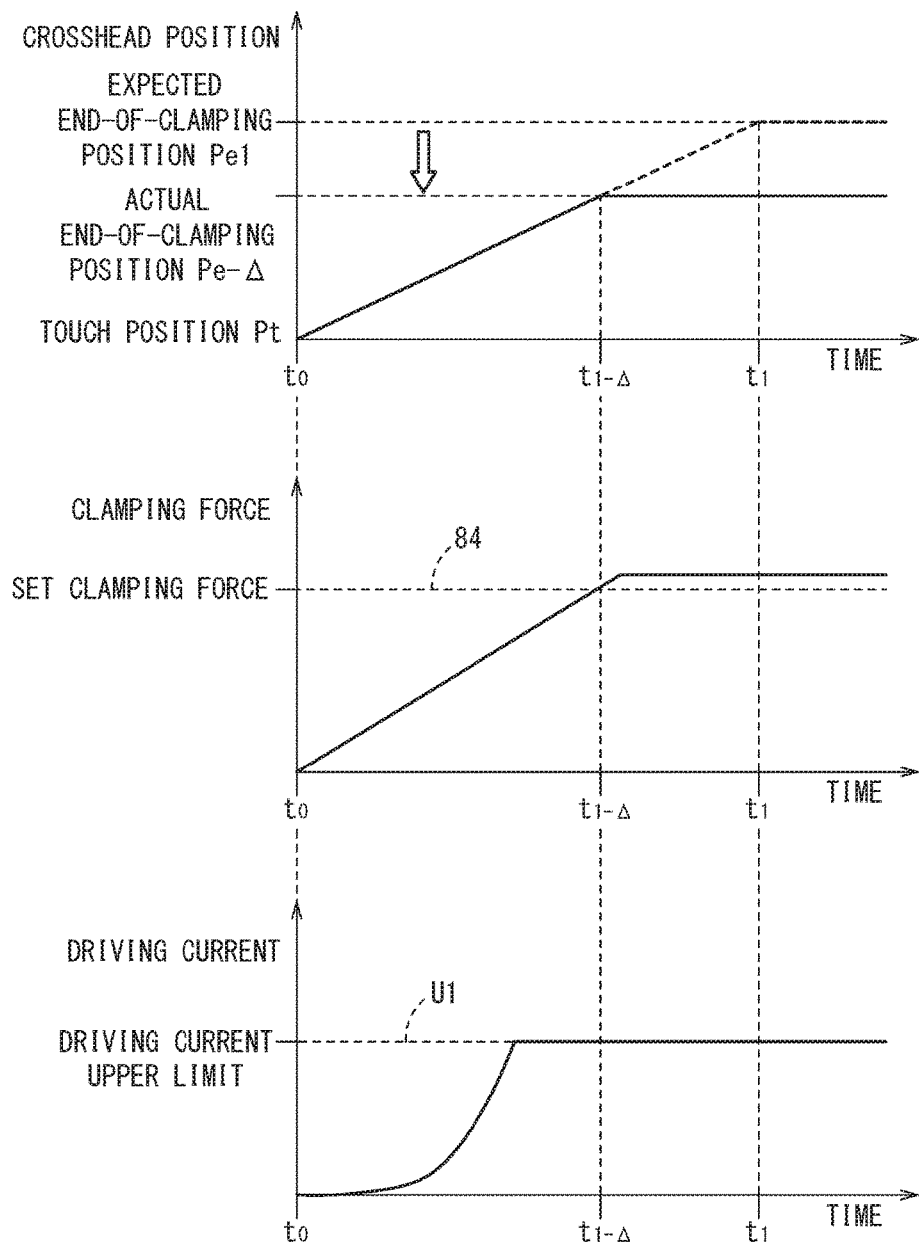
FIG. 5 is a graph showing an example of time variations of the crosshead position, clamping force and driving current when the mold clamping force sensor is abnormal.

Conversely, when the clamping force sensor 64 is abnormal, for example, as shown in the top graph of FIG. 5, the crosshead 42 of the toggle mechanism 40 results in arriving at the actual end-of-clamping position Pe (the actual end-of-clamping position Pe-$\Delta$) at time $t_{1-\Delta}$ before time $t_1$ for the end-of-clamping position Pe (the expected end-of-clamping position Pe1) expected from time $t_0$ for the touch position Pt.

In this case, as shown in the middle graph of FIG. 5, the clamping force increases from time $t_0$ to time $t_{1-\Delta}$, and reaches the set clamping force 84 at time $t_{1-\Delta}$ for the actual end-of-clamping position Pe-$\Delta$. Further, as shown in the bottom graph of FIG. 5, when the actual end-of-clamping position Pe-$\Delta$ occurs earlier than the expected end-of-clamping position Pe1, the driving current of the mold clamping servomotor 50 rises earlier than time $t_{1-\Delta}$, and consequently reaches the upper limit U1.

Here, as described above, based on the upper limit U1 of the driving current included in the control command of the servomotor drive control unit 76, the power supply unit 54 (see FIG. 1) commands the servo amplifier 58 to output a current so as not to exceed the upper limit U1. Therefore, the servo amplifier 58 limits the rise of the driving current and drives the mold clamping servomotor 50 with low torque. That is, movement of the crosshead 42 having reached the actual end-of-clamping position Pe-$\Delta$ is stopped in a state that a clamping force slightly greater than the set clamping force 84 is applied.

Further, stoppage of movement of the crosshead 42 continues also after time $t_{1-\Delta}$ since torque of the mold clamping servomotor 50 is limited. For this reason, when stoppage of movement of the crosshead 42 is detected before reaching the expected end-of-clamping position Pe1, the detection result of the clamping force by the clamping force sensor 64 can be regarded as being incorrect. That is, the controller 20 can easily determine an abnormality of the clamping force sensor 64 based on stopping of rotation of the mold clamping servomotor 50 (the crosshead 42).

Returning to FIG. 2, the servomotor drive control unit 76 of the controller 20 outputs, to the power supply unit 54, a control command for controlling the mold clamping servomotor 50 at the time of injection molding, such that the crosshead 42 moves to the end-of-clamping position Pe that has been set in the adjustment operation. On the other hand, at the trial step of the adjustment operation, by receiving the upper limit U1 of the driving current from the upper limit setting unit 74, the control unit 76 outputs a control command for limiting the driving current to be supplied to the mold clamping servomotor 50, to the upper limit U1. As a result, the axis control circuit 56 permits the driving current to increase up to the upper limit U1, and suppresses the increase of the driving current beyond the limit when the driving current reaches the upper limit U1.

In addition, the moving state acquisition unit 78 receives detection signals transmitted from the encoder 52 and calculates the moving state including the position, speed, stoppage, etc., of the crosshead 42. Then, the calculation result is stored in the storage unit (memory storage area: not shown) in the moving state acquisition unit 78. The moving state of the crosshead 42 can be determined by various methods, not limited to the detection signals by the encoder 52. For example, a speed detection sensor and a position detection sensor that directly detect the speed and the position of the crosshead 42 may be installed in the toggle mechanism 40 so as to obtain the moving state based on signals from these sensors.

The abnormality determination processing unit 80 in the controller 20 determines whether the clamping force sensor 64 is normal or abnormal based on the moving state of the crosshead 42 acquired by the moving state acquisition unit 78. In determination of abnormality, execution of a trial step should preferably be recognized by receiving information that the servomotor 50 is driven under the condition with the upper limit U1 set through the servomotor drive control unit 76.

If the moving state acquisition unit 78 detects that the movement of the crosshead 42 has stopped before reaching the expected end-of-clamping position Pe1, the abnormality determination processing unit 80 determines that the clamping force sensor 64 is abnormal. That is, it can be regarded that the expected end-of-clamping position Pe1 is erroneous because the detection of the clamping force by the clamping force sensor 64 is incorrect. In contrast, when the moving state acquisition unit 78 determines that the crosshead 42 continuously moves and stops at the expected end-of-clamping position Pe1, it can be regarded that the detection by the clamping force sensor 64 is normal.

On determining that the clamping force sensor 64 is abnormal, the abnormality determination processing unit 80 notifies the operator of the error (abnormality determination result) of the clamping force sensor 64 through the touch panel 66. The means for indicating the error is not particularly limited, and for example, other notifying units (unillustrated speaker, warning lamp, etc.) provided on the injection molding machine 10 may be used. Further, the abnormality determination processing unit 80 may be configured to, when abnormality of the clamping force sensor 64 has been detected, prompt the operator to retry the adjustment operation of the clamping force, and further prohibit injection molding until the adjustment operation is completed. Moreover, the abnormality determination processing unit 80 transmits the abnormality determination result of the clamping force sensor 64 to the central management device 24 of the management system 26 in the factory via a network.

The central management device 24 includes a processor, a memory, and an input/output interface, and is a main computer (including a server) of the management system 26 that manages multiple injection molding machines 10. Upon receiving an abnormality determination result from a certain injection molding machine 10, the central management device 24 displays, on the monitor of the central management device 24, a message that there is an abnormality in the clamping force sensor 64 of the injection molding machine 10. Thus, the manager or administrator of the management system 26 can immediately grasp the abnormality of the clamping force sensor 64 of the injection molding machine 10.

The controller 20 and the management system 26 of the injection molding machine 10 according to the first embodiment are essentially configured as described above, and the operation will be described hereinbelow.

In the injection molding machine 10, an adjustment operation for adjusting the clamping force of the injection mold 16 is performed at an appropriate time based on an operator's instruction. In the adjustment operation, as described above, the mold clamping adjustment step for adjusting the clamping force of the injection mold 16 is performed by operating the mold clamping adjustment mechanism 30. At this time, the mold clamping adjusting unit 72 in the controller 20 drives and controls the mold height adjustment motor 62 of the mold clamping adjustment mechanism 30 to integrally move the movable mold 14, the moving platen 34, the toggle mechanism 40 and the rear platen 36. During the movement, the controller 20 detects the elongation (clamping force) of the tie bar 38 by the clamping force sensor 64, and sets the end-of-clamping position Pe at which the crosshead 42 stops according to the detected clamping force.

In the adjustment operation, a trial step is performed after the mold clamping adjustment step. In this case, as shown in FIG. 6, the controller 20 adds the upper limit U1 of the driving current set by the upper limit setting unit 74 to a control command of the servomotor drive control unit 76 (step S1). Upon receiving the control command, the power supply unit 54 imposes the upper limit U1 on the driving current so that the mold clamping servomotor 50 is driven to rotate with its torque being limited by limiting the supplied electric power to the upper limit U1 or less.

Then, the abnormality determination processing unit 80 in the controller 20 monitors the moving state information (the detection signal from the encoder 52) on the crosshead 42 acquired by the moving state acquisition unit 78, and determines whether the crosshead 42 has stopped moving during the movement (step S2). If the crosshead 42 continues to move at step S2, the control proceeds to step S3. If the crosshead 42 stops moving, it is determined that the clamping force sensor 64 is abnormal, and the control goes to step S4.

At step S3, the abnormality determination processing unit 80 determines whether or not the crosshead 42 has reached the end-of-clamping position Pe (expected end-of-clamping position Pe1), that is, whether or not clamping has been completed. If the crosshead 42 has not reached the end-of-clamping position Pe (step S3: NO), the control returns to step S1, and the same process is repeated thereafter.

On the other hand, when the crosshead 42 has reached the expected end-of-clamping position Pe1 (step S3: YES) at step S3, the trial step is terminated. That is, when the crosshead 42 reaches the expected end-of-clamping position Pe1, it can be determined that mold clamping of the injection mold 16 has been performed normally. As a result, also in actual processing, the injection molding machine 10 can produce an appropriate clamping force in the clamping operation of the injection mold 16 and perform injection molding successfully.

In contrast, when the movement of the crosshead 42 is stopped (step S2: YES), there is an abnormality in the clamping force sensor 64, and the abnormality determination processing unit 80 performs a process based on abnormality determination (Step S4). In this process, for example, the movable mold 14 is stopped or retracted, and at the same time a message of an abnormality of the clamping force sensor 64 is displayed on the touch panel 66. Further, the controller 20 transmits the abnormality determination result to the central management device 24. When the process based on the abnormality determination is completed, the controller 20 ends the trial step. Then, the operator can take necessary measures (for example, exchange of the clamping force sensor 64 or the like) based on the notified abnormality determination result. Thereafter, by performing the adjustment operation again, it is possible to prevent malfunctions and failures of the injection molding machine 10 beforehand.

When receiving an abnormality determination result from a certain injection molding machine 10, the central management device 24 that manages multiple injection molding machines 10 notifies the operator or the like of the fact that the clamping force sensor 64 of the identified injection molding machine 10 is abnormal, by means of the monitor of the central management device 24, whereby the manager or administrator of the management system 26 can immediately recognize the abnormality.

As described above, the controller 20 of the injection molding machine 10 according to the first embodiment controls mold clamping of the fixed mold 12 and the movable mold 14. The controller 20 includes: the servomotor drive control unit 76 that controls driving current of the mold clamping servomotor 50 for generating a clamping force by moving the movable mold 14 and limits the increase in driving current during the driving of the mold clamping servomotor 50 by setting an upper limit U1 for the driving current; the moving state acquisition unit 78 that acquires detection signals from the encoder 52 as the information relating to the movement of the movable mold 14; the clamping force acquisition unit 70 that acquires information on the clamping force from the clamping force sensor 64 for detecting information (the elongation of the tie bar 38) on the clamping force with which the fixed mold 12 and the movable mold 14 are clamped; and the mold clamping adjusting unit 72 that adjusts the end-of-clamping position Pe of the movable mold 14 by operating the mold clamping adjustment mechanism 30 based on the clamping force. The controller 20 further includes the abnormality determination processing unit 80 that determines occurrence of an abnormality in the clamping force sensor 64 when recognizing stoppage of movement of the movable mold 14 during mold clamping, based on the information from the moving state acquisition unit 78.

Similarly, the management system 26 according to the first embodiment includes the controller 20 of the injection molding machine 10 for controlling mold clamping of the fixed mold 12 and the movable mold 14, and the central management device 24 connected to the controller 20 so as to be able to perform information communication. And the system manages the states of multiple injection molding machines 10 by the central management device 24. The controller 20 for each of the multiple injection molding machines 10 includes: the servomotor drive control unit 76 that controls driving current of the mold clamping servomotor 50 for generating a clamping force by moving the movable mold 14, and during the driving of the mold clamping servomotor 50, limits the increase in driving current by setting an upper limit U1 for the driving current; the moving state acquisition unit 78 that acquires detection signals from the encoder 52 as the information relating to the movement of the movable mold 14; the clamping force acquisition unit 70 that acquires information on the clamping force from the clamping force sensor 64 for detecting information on the clamping force with which the fixed mold 12 and the movable mold 14 are clamped; and the mold clamping adjusting unit 72 that adjusts the end-of-clamping position Pe of the movable mold 14 by operating the mold clamping adjustment mechanism 30 based on the clamping force. The controller 20 determines occurrence of an abnormality of the clamping force sensor 64 and gives a notice based on the abnormality determination when recognizing stoppage of movement of the movable mold 14 based on the information from the moving state acquisition unit 78 during mold clamping.

In this way, the controller 20 and management system 26 limit the increase in driving current by setting the upper limit U1 of the driving current by the servomotor drive control unit 76, whereby it is possible to prevent an excessive clamping force from being applied when clamping the movable mold 14 and the fixed mold 12. That is, breakage and the like of the machine due to an excessive clamping force can be avoided by a simple structure. Further, if the driving current is limited, it can be regarded that a large clamping force is applied to the injection mold 16. By the controller 20 also detecting stoppage of movement of the movable mold 14 during mold clamping, it is possible to accurately determine occurrence of an abnormality of the clamping force sensor 64. Thus, it is possible to detect an abnormality of the clamping force sensor 64 at an early stage without the need of devices such as a spare clamping force sensor and the like, and suppress manufacturing defects of molded products, damage to the machine, and other faults.

The upper limit U1 of the driving current may preferably be a current value that produces a clamping force slightly greater than the set clamping force 84 generated in clamping the movable mold 14 and the fixed mold 12. This makes it possible to easily recognize the end-of-clamping position Pe in the adjustment operation, hence it is possible to more reliably reduce breakage and other faults of the machine in mold clamping of the injection mold 16.

Further, when determining that the clamping force sensor 64 is abnormal, the abnormality determination processing unit 80 indicates the abnormality determination result via the touch panel 66 connected to the controller 20. Therefore, the operator of the injection molding machine 10 can easily know the abnormality of the clamping force sensor 64.

Further, the injection molding machine 10 includes an encoder 52 that detects the number of revolutions or the angle of rotation of the mold clamping servomotor 50 as the information on the movement of the movable mold 14, and transmits the detection signal to the moving state acquisition unit 78. Thereby, the controller 20 can recognize movement of the crosshead 42 (the movable mold 14) and stoppage of movement thereof with high accuracy.

Furthermore, the fixed mold 12 is fixed to and supported by tie bars 38 extending in the moving direction of the movable mold 14, and the clamping force sensor 64 detects the strain amount of the tie bar 38 as the information on the clamping force. In this way, the controller 20, by acquiring the strain amount of the tie bar 38, can easily calculate the clamping force generated between the fixed mold 12 and the movable mold 14.

The controller 20 and management system 26 of the injection molding machine 10 according to the first embodiment are not limited to the above-described configurations, and various application examples and modification examples can be adopted. For example, the mechanism for moving the movable mold 14 is not limited to the above-described toggle mechanism 40, but various mechanisms can be applied. As a mechanism for moving the movable mold 14, a hydraulic cylinder, a pneumatic cylinder, a solenoid, a linear actuator or the like can be used in addition to the toggle mechanism 40.

In addition, when, for example, abnormality of the clamping force sensor 64 is not eliminated, the controller 20 may control the movement of the movable mold 14 by setting the upper limit U1 for the driving current not only during the adjustment operation but also when actual processing is performed (during injection molding). This makes it possible to perform a mold clamping operation while suppressing (regulating) the clamping force, hence the occurrence of mechanical failures of the injection molding machine 10 can be reduced.

Further, the controller 20 may be configured to receive and use the driving current (the driving current value detected by the ammeter 60) output from the servo amplifier 58 to the mold clamping servomotor 50 in performing an abnormality determination process of the clamping force sensor 64. For example, as indicated by the dotted lines in FIG. 2, the controller 20 may include a current value acquisition unit 86 that acquires a detection signal of the driving current from the ammeter 60, and may be configured to monitor the driving current (or the torque of the mold clamping servomotor 50). As a result, the abnormality determination processing unit 80 can reliably recognize that the driving current has reached the upper limit U1, and then can determine occurrence of abnormality in the clamping force sensor 64 when stoppage of movement of the movable mold 14 is detected. Therefore, the controller 20 can determine abnormality of the clamping force sensor 64 with higher accuracy.

Furthermore, the abnormality determination processing unit 80 of the present embodiment determines that the clamping force sensor 64 is normal when recognizing that the movable mold 14 has reached the expected end-of-clamping position Pe1 and stopped moving at the expected end-of-clamping position Pe1. In this way, it is possible to easily recognize that the adjustment work of the injection mold 16 has been correctly performed. In addition to this, the abnormality determination processing unit 80 according to a modification may be configured to determine that the clamping force sensor 64 is abnormal when recognizing that the movable mold 14 continues to move even after reaching the expected end-of-clamping position Pe1. That is, the abnormality determination processing unit 80 recognizes that the actual end-of-clamping position Pe-Δ is located closer to the distal end side (X1 side) than the expected end-of-clamping position Pe1 due to the abnormality of the clamping force sensor 64. In this case as well, abnormality of the clamping force sensor 64 can be detected suitably.

Moreover, the controller 20 can also detect whether the current detector (ammeter 60) for detecting the driving current supplied to the mold clamping servomotor 50 is normal or abnormal, based on the clamping force detected by the clamping force sensor 64. That is, it can be said that when the clamping force sensor 64 is normal, the toggle mechanism 40 achieves normal movement to the end-of-clamping position Pe so as to be able to produce the set clamping force 84 correctly. Therefore, the controller 20 can determine that an abnormality occurs in the ammeter 60 (a failure has occurred) when the driving current detected by the ammeter 60 is extremely high or low.

Alternatively, the management system 26 may be configured to transmit the information on the movement of the movable mold 14 (the moving state of the crosshead 42 and the driving current value) to the central management device 24 so that the central management device 24 monitors stoppage of movement of each movable mold 14. Thereby, in an unillustrated abnormality determination processing unit of the central management device 24, it is also possible to determine whether each injection molding machine 10 (each clamping force sensor 64) is normal or abnormal.

Second Embodiment

A controller 20A of the injection molding machine 10 according to a second embodiment of the present invention differs from the controller 20 according to the first embodiment in that while controlling the driving of the mold clamping servomotor 50 without setting any upper limit U1 on the driving current, the controller 20A determines abnormality of the clamping force sensor 64 by monitoring the driving current detected by the ammeter 60. In the following description, the same components as those in the first embodiment are denoted by the same reference numerals, and description thereof is omitted.

Figure 7:
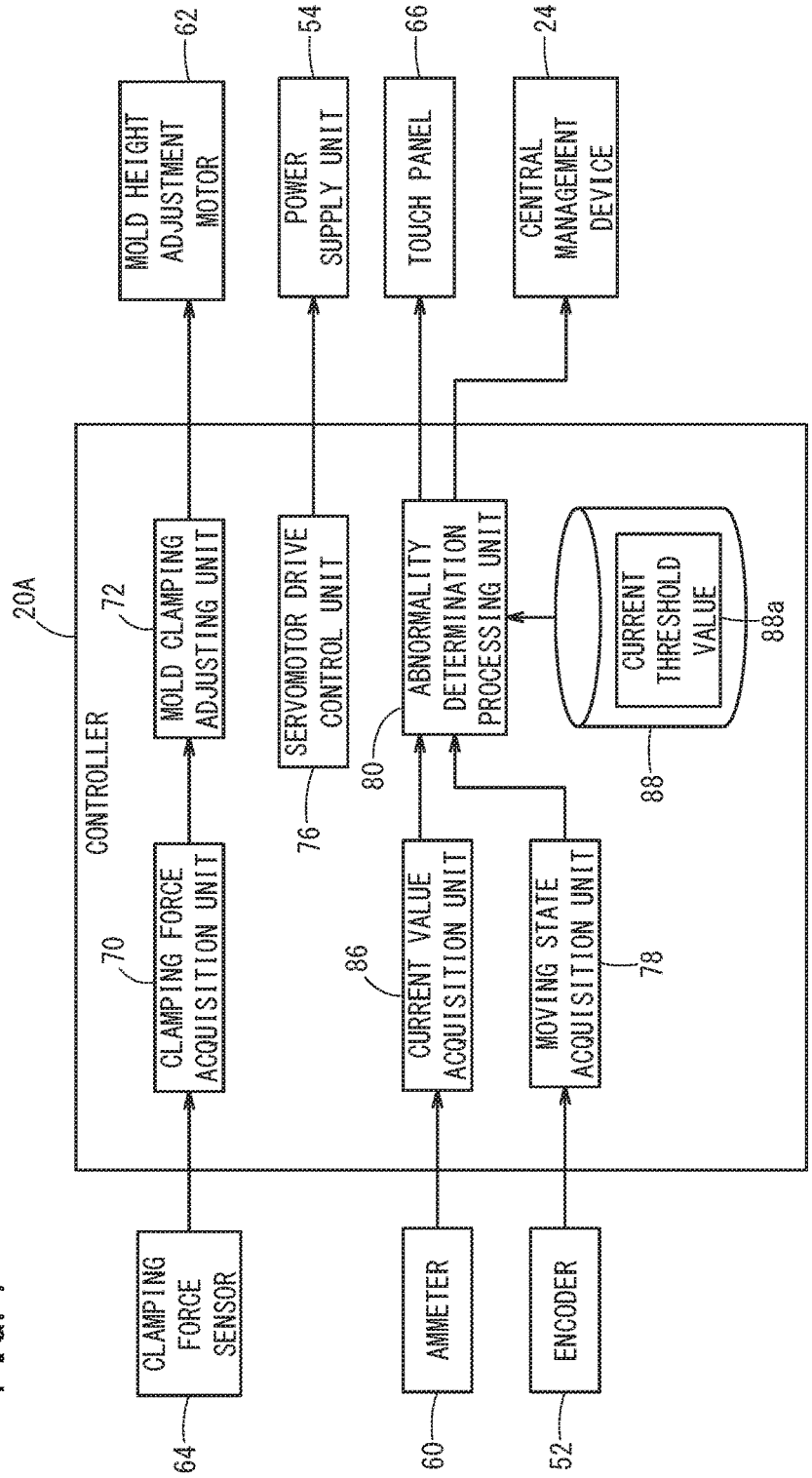
FIG. 7 is a functional block diagram of a controller of an injection molding machine according to a second embodiment of the present invention.

Specifically, as shown in FIG. 7, the controller 20A according to the second embodiment includes a current value acquisition unit 86 that acquires a detection signal of the ammeter 60, and a threshold storage unit 88 (memory storage area) that stores a current threshold value 88a therein.

The current value acquisition unit 86 receives a detection signal (driving current value) of the mold clamping servomotor 50 transmitted from the ammeter 60, and stores it in a storage unit (storage area of memory: not shown) within the current value acquisition unit 86. The current value acquisition unit 86 may calculate the torque of the mold clamping servomotor 50 based on the received driving current value. The current threshold value 88a is a threshold value based on which an excessive increase in driving current is determined, and is set at, for example, approximately the same level as the upper limit U1 in the first embodiment.

Figure 8:
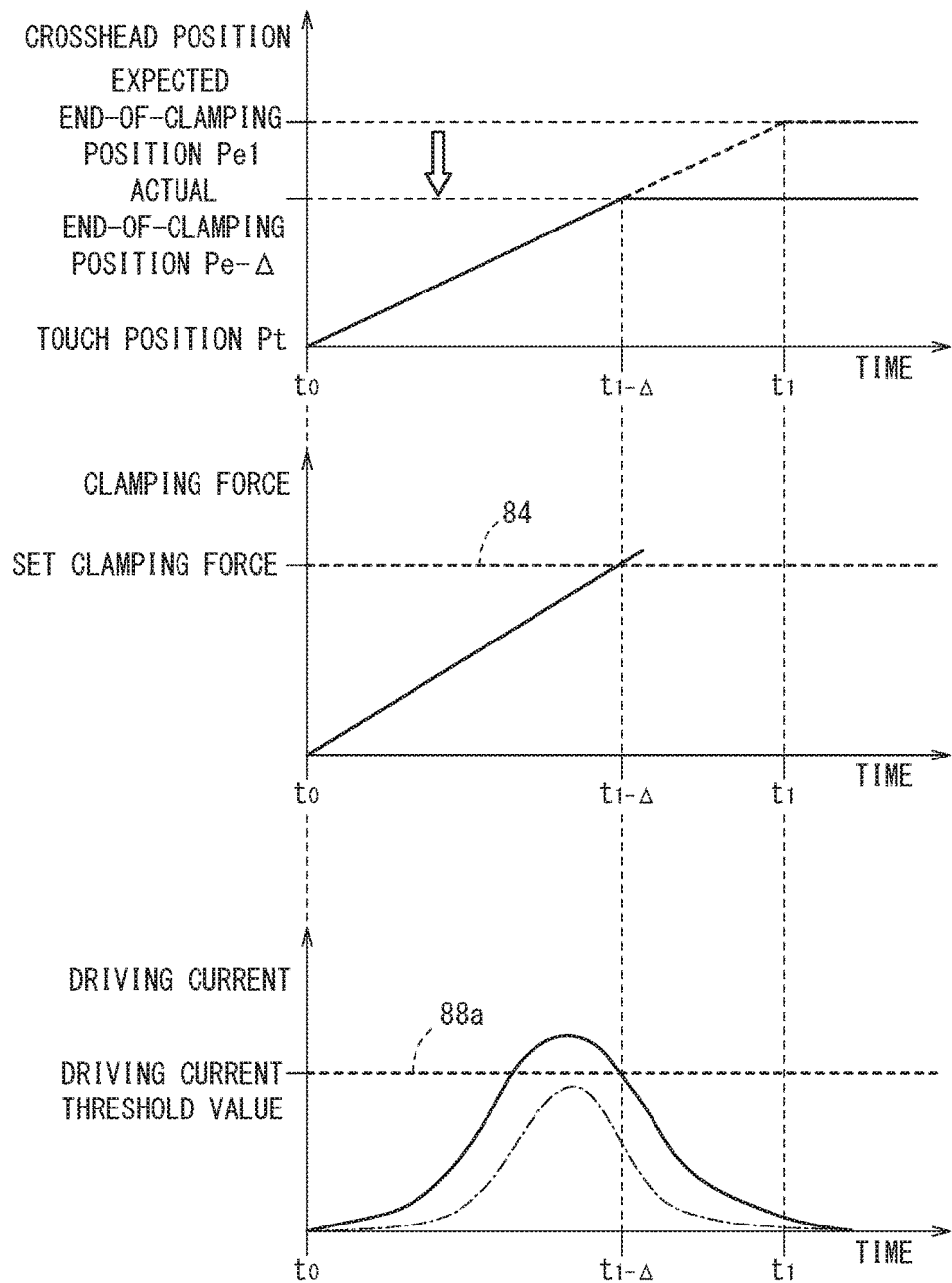
FIG. 8 is a graph showing an example of time variations of the crosshead position, clamping force and driving current when the clamping force sensor is abnormal in the controller of FIG. 7.

Then, during movement of the movable mold 14, the abnormality determination processing unit 80 reads the current threshold value 88a (upper limit) from the threshold storage unit 88 and compares it with the driving current value acquired by the current value acquisition unit 86. For example, as shown in FIG. 8, when the driving current is lower than the current threshold value 88a (see the one dot chain line in the bottom graph in FIG. 8), it can be regarded that the crosshead 42 (the movable mold 14) reaches the end-of-clamping position Pe without increase of the driving current. On the other hand, when the driving current value exceeds the current threshold value 88a (see the solid line in the bottom graph in FIG. 8), the movable mold 14 reaches the end-of-clamping position Pe, and further advances beyond the position Pe to push against the fixed mold 12. That is, when the driving current value exceeds the current threshold value 88a, it can be considered that the movable mold 14 has stopped at the actual end-of-clamping position Pe-Δ short of the expected end-of-clamping position Pe1, whereby it is possible to determine an abnormality of the clamping force sensor 64.

Figure 9:
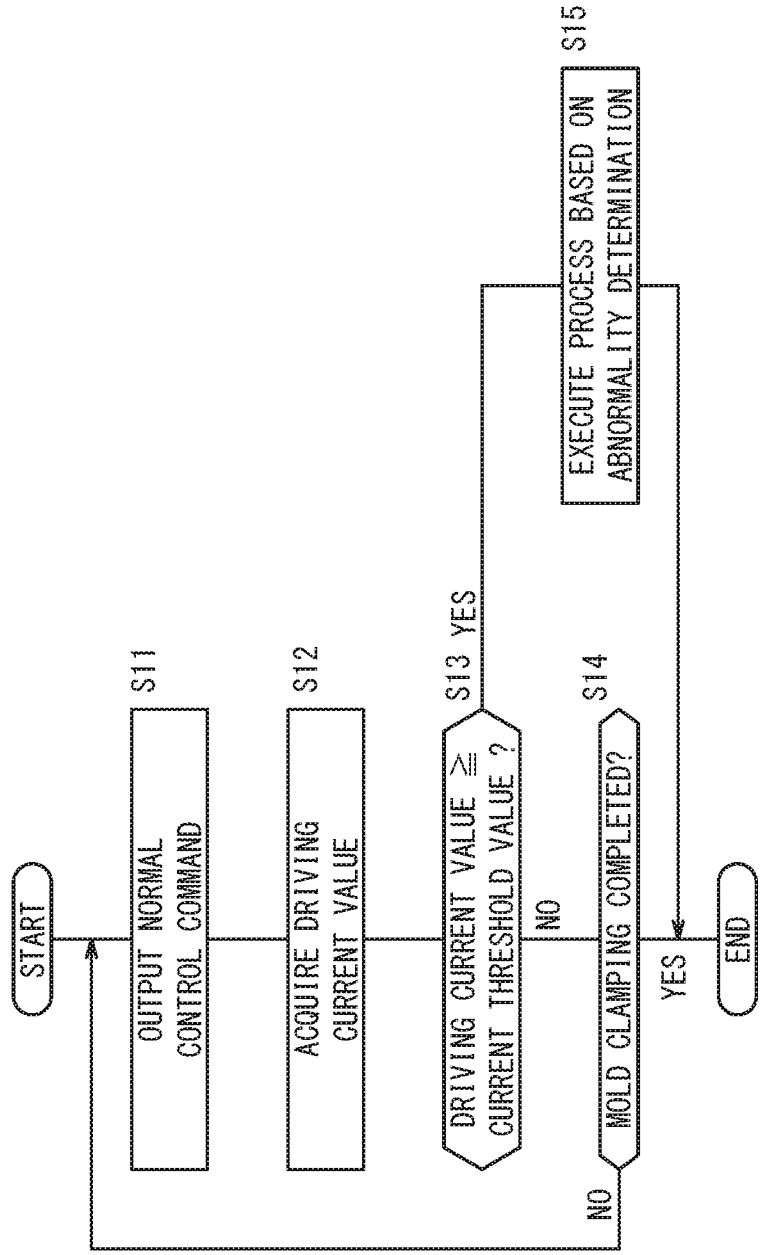
FIG. 9 is a flowchart showing a processing flow of determining whether a clamping force sensor is abnormal or not, according to the second embodiment.

Next, the operation of the controller 20A according to the second embodiment thus configured will be described. Specifically, as shown in FIG. 9, in the trial step of the adjustment operation, the servomotor drive control unit 76 outputs a normal control command for moving the movable mold 14 to the power supply unit 54 (step S11). That is, the control command is information on the position or speed of the crosshead 42 for which the upper limit U1 (torque limit) is not set.

Then, the current value acquisition unit 86 of the controller 20A acquires from the ammeter 60 the driving current value during movement of the crosshead 42 (during the driving of the mold clamping servomotor 50) (step S12). The abnormality determination processing unit 80 compares the acquired driving current value with the current threshold value 88a stored in the threshold storage unit 88, and determines whether or not the driving current is equal to or greater than the current threshold value 88a (Step S13). When the driving current value does not exceed the current threshold value 88*a*, the control proceeds to step S14. On the other hand, when the driving current is equal to or greater than the current threshold value 88*a*, the control goes to step S15.

At step S14, the abnormality determination processing unit 80 determines whether or not the end-of-clamping position Pe has been reached, based on the position information of the crosshead 42 (the movable mold 14) acquired by the encoder 52. If the crosshead 42 has not reached the end-of-clamping position Pe, the control returns to step S11, and the same process is repeated.

On the other hand, at step S15, the abnormality determination processing unit 80 performs a process based on abnormality determination. In this process, as in the first embodiment, for example, the servomotor drive control unit 76 immediately stops or retracts the movable mold 14 (limits the increase in driving current), and displays on the touch panel 66 a notice that an abnormality occurs in the clamping force sensor 64. Thereby, the injection molding machine 10 is prevented from having a clamping force greater than the set clamping force 84.

Further, the controller 20A transmits the abnormality determination result to the central management device 24. Incidentally, it goes without saying that the controller 20A according to the second embodiment can also be applied to the management system 26 described in the first embodiment, and the central management device 24 may be configured to inform the manager of occurrence of the abnormality.

As described above, the controller 20A of the injection molding machine 10 according to the second embodiment can also achieve the same effects as those of the controller 20 of the injection molding machine 10 according to the first embodiment. That is, based on the fact that the driving current increases to a value equal to or greater than a predetermined value, the abnormality of the clamping force sensor 64 is determined, and the mold-clamping operation of the movable mold 14 by the toggle mechanism 40 is stopped, whereby it is possible to reduce machine failures.

It is a matter of course that the controller 20A and management system 26 of the injection molding machine 10 according to the second embodiment can also adopt various application examples and modifications. For example, the central management device 24 may be configured to acquire information on the clamping force of the clamping force sensor 64 and the moving state of the crosshead 42 (movable mold 14), state information of the driving current value and the other information from the multiple injection molding machines 10 and monitor the state of each injection molding machine 10. As one example, the central management device 24 may be configured to calculate the average of the peak driving current values of all the machines, compare the calculated average with the peak of the driving current value received from each controller 20, and then determine occurrence of an abnormality in the clamping force sensor 64 of an injection molding machine 10 when the peak current deviates from the average significantly.

While the invention has been particularly shown and described with reference to preferred embodiments, it will be understood that variations and modifications can be effected thereto by those skilled in the art without departing from the scope of the invention as defined by the appended claims.

What is claimed is:

1. A controller for an injection molding machine for controlling mold clamping of a fixed mold and a movable mold, comprising:

a motor drive control unit configured to control driving current of a motor and limit increase in the driving current during driving of the motor, based on an upper limit of the driving current, the motor being configured to move the movable mold and generate a clamping force;

a moving state acquisition unit configured to acquire information on movement including a position of the movable mold;

a clamping force acquisition unit configured to acquire information on the clamping force from a clamping force detector configured to detect information on the clamping force with which the fixed mold and the movable mold are clamped;

a mold clamping adjusting unit configured to adjust an end-of-clamping position of the movable mold by operating a mold clamping adjustment mechanism based on the information on the clamping force; and an abnormality determination processing unit configured to determine that the clamping force detector is abnormal when recognizing the position of the movable mold and stoppage of movement of the movable mold during mold clamping, based on the information from the moving state acquisition unit.

2. The controller for the injection molding machine according to claim 1, wherein the upper limit of the driving current is a current value that produces a clamping force greater than a predetermined clamping force generated in clamping the movable mold and the fixed mold.

3. The controller for the injection molding machine according to claim 1, wherein the abnormality determination processing unit is configured to, when determining that the clamping force detector is abnormal, give a notice of determination result of abnormality via a notifying unit connected to the controller.

4. The controller for the injection molding machine according to claim 1, wherein the injection molding machine includes a rotary detection unit configured to detect number of revolutions or angle of rotation of the motor as the information on the movement of the movable mold and transmit a signal detected by the rotary detection unit, to the moving state acquisition unit.

5. The controller for the injection molding machine according to claim 1, wherein:

the fixed mold is fixed to and supported by a tie bar extending in a moving direction of the movable mold; and, the clamping force detector is a sensor configured to detect a strain amount of the tie bar as the information on the clamping force.

6. The controller for the injection molding machine according to claim 1, wherein:

the controller includes a current value acquisition unit configured to acquire a detection signal of the driving current from a current detector configured to detect the driving current of the motor; and the abnormality determination processing unit is configured to, when recognizing stoppage of movement of the movable mold after the driving current has reached the upper limit, determine that the clamping force detector is abnormal.

7. A management system that includes a controller for an injection molding machine configured to control mold clamping of a fixed mold and a movable mold, and a central management device connected to the controller so as to be able to perform information communication with the controller, the management system managing states of multiple injection molding machines by the central management device, wherein the controller for each of the multiple injection molding machines includes:
- a motor drive control unit configured to control driving current of a motor and limit increase in the driving current during driving of the motor, based on an upper limit of the driving current, the motor being configured to move the movable mold and generate a clamping force;
- a moving state acquisition unit configured to acquire information on movement including a position of the movable mold;
- a clamping force acquisition unit configured to acquire information on the clamping force from a clamping force detector configured to detect information on the clamping force with which the fixed mold and the movable mold are clamped; and
- a mold clamping adjusting unit configured to adjust an end-of-clamping position of the movable mold by operating a mold clamping adjustment mechanism based on the information on the clamping force, and
- the controller or the central management device is configured to determine that the clamping force detector is abnormal when recognizing the position of the movable mold and stoppage of movement of the movable mold during mold clamping, based on the information from the moving state acquisition unit, and give a notice based on determination of abnormality.

* * * * *